UNITED STATES PATENT OFFICE.

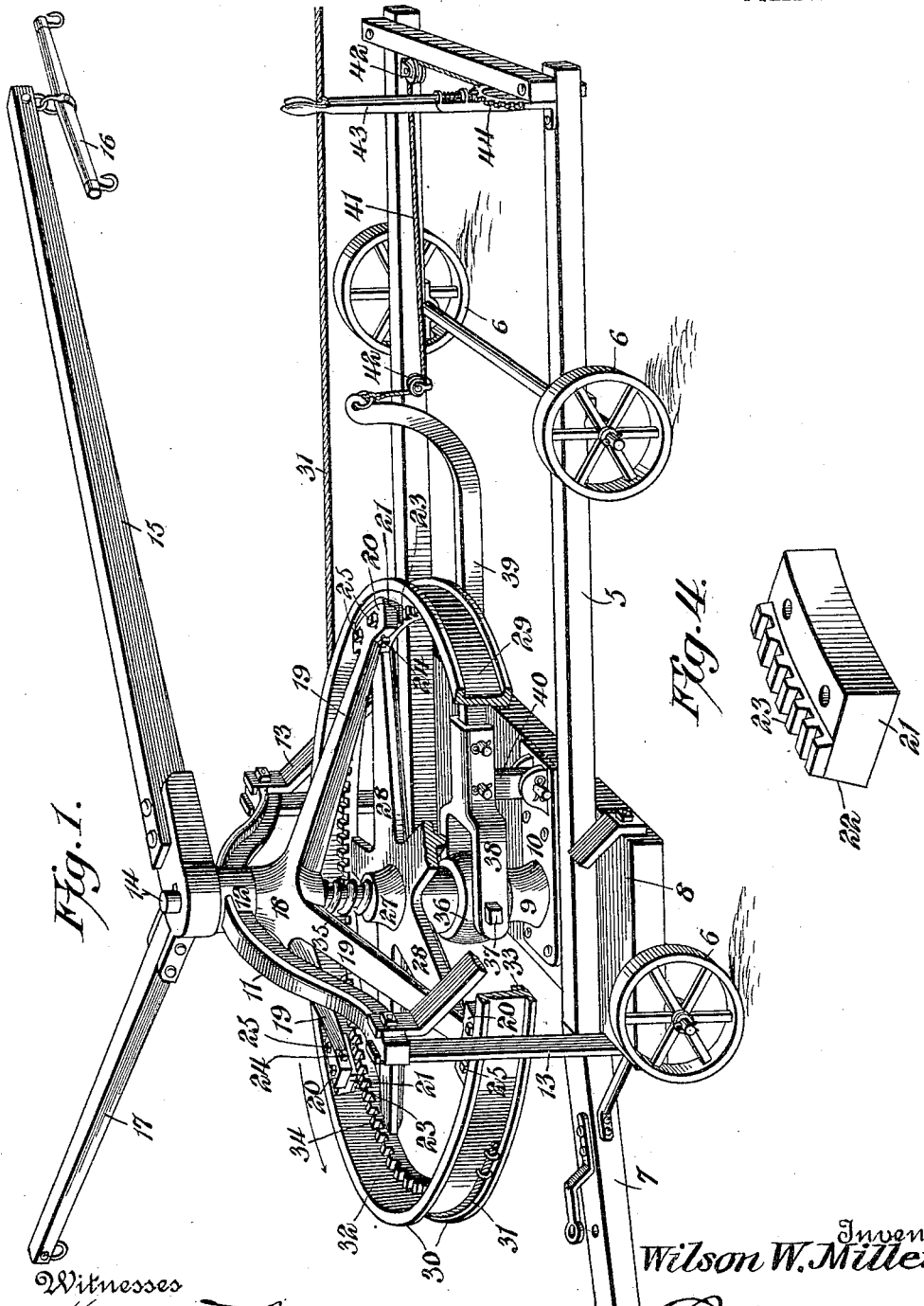

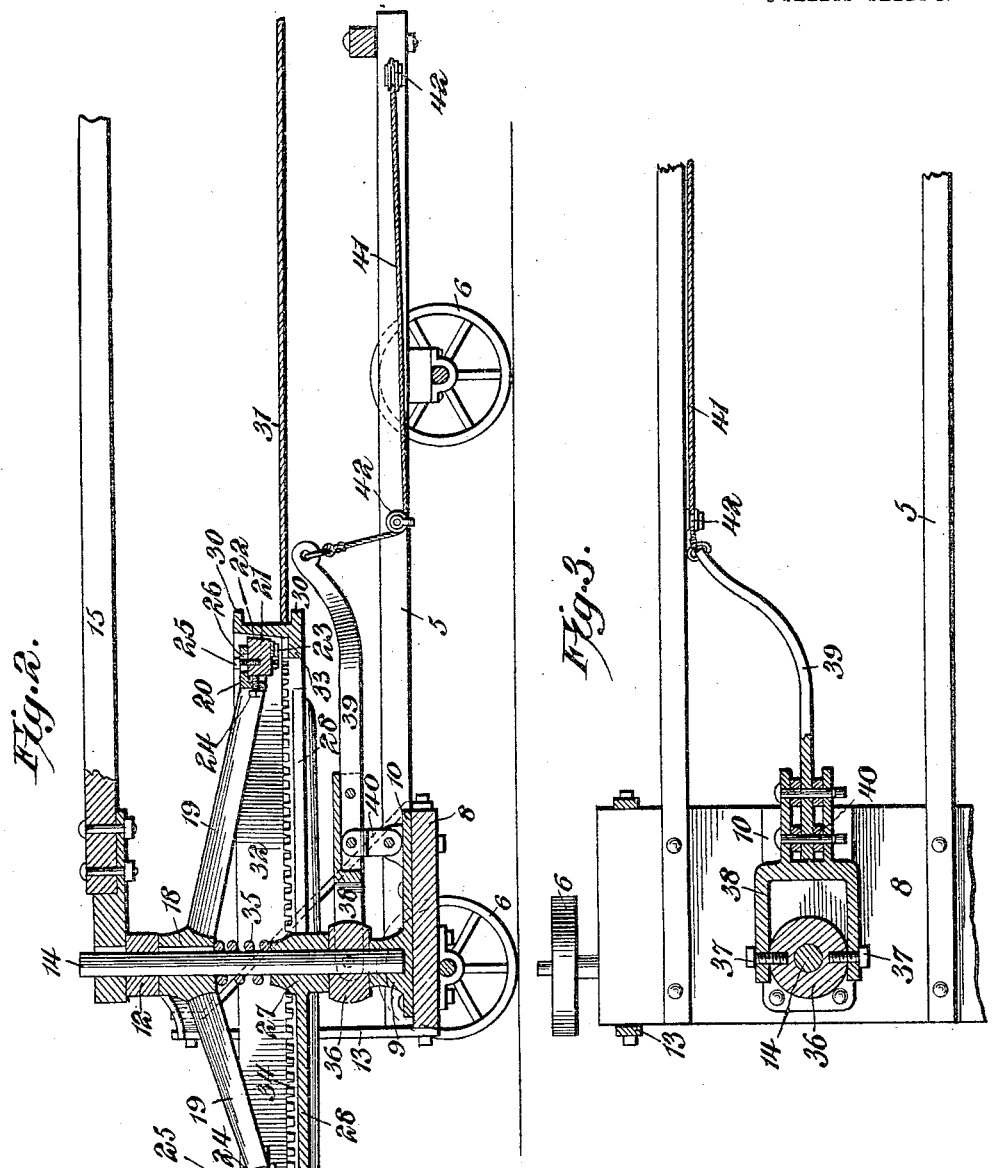

WILSON W. MILLER, OF NEWTON, KANSAS.

HOISTING APPARATUS.

No. 824,258.      Specification of Letters Patent.      Patented June 26, 1906.

Application filed August 26, 1905. Serial No. 275,942.

*To all whom it may concern:*

Be it known that I, WILSON W. MILLER, a citizen of the United States, residing at Newton, in the county of Harvey and State of Kansas, have invented a new and useful Hoisting Apparatus, of which the following is a specification.

This invention relates more particularly to animal-power-operated drums for hoisting purposes.

The principal object is to provide novel means of a simple nature whereby a draft-animal will be able to lift a comparatively great load and wherein there is no necessity for backing such animal in unwinding the hoisting-cable after a load has been raised and the apparatus is being lowered for another.

Another object is to provide mechanism that is comparatively simple, is not liable to become deranged, and can be readily transported from place to place. The structure is thus peculiarly useful for stacking and elevating hay and the like; but its utility is not limited in this respect, as it may be employed for a great variety of lifting purposes.

The preferred embodiment of the invention is illustrated in the accompanying drawings, wherein—

Figure 1 is a perspective view of the mechanism. Fig. 2 is a longitudinal sectional view therethrough. Fig. 3 is a cross-sectional view. Fig. 4 is a detail perspective view of one of the shoe-blocks inverted.

Similar reference-numerals designate corresponding parts in all the figures of the drawings.

In the embodiment illustrated a base-frame 5 is employed, which is preferably supported on wheels 6 and has a tongue 7 detachably associated therewith in order that the apparatus may be readily transported. The frame includes a platform 8, secured thereto and having a step-bearing 9, which includes a plate 10, fastened to the platform. A yoke 11 is located over the platform and has a central boxing 12 alined with the step-bearing 9, the yoke being supported at its ends by standard-braces 13, secured to said ends and to the ends of the platform 8.

A driving member consists of an upright shaft 14, journaled in the step-bearing 9 and boxing 12, said shaft having its upper end projecting above the yoke. A sweep 15 is attached to the projecting end and carries at its outer free end a whiffletree 16, to which the draft-animal is hitched, while a leading-arm 17 is also carried by the upper end of the shaft.

Keyed or otherwise secured to the shaft just below the boxing 12 is a spider comprising a hub 18, having radial arms 19 terminating at their outer ends in heads 20, said heads being practically in the form of casings with top, rear, and end walls. Shoes in the form of wooden blocks 21 are carried by the heads 20, said shoes having inclined or beveled outer faces 22, and, furthermore, carrying depending teeth 23. The shoes are adjustable upon the heads, the adjustment being obtained by means of set-screws 24, threaded through the rear walls of the heads and abutting against the rear sides of said shoes. The shoes, moreover, are held in adjusted positions by clamping-bolts 25, passing through slots 26 in the top of the heads and being threaded into the shoes, as clearly illustrated in Fig. 2.

Mounted on the shaft beneath the spider is a drum consisting of a hub 27, loosely journaled on the shaft and having radiating arms 28, carrying at their outer ends an upright annular wall 29, provided with spaced outstanding flanges 30, between which a hoisting-cable 31 is arranged to be wound.

The inner face 32 of the annular wall is inclined, as shown in Fig. 2, and constitutes a friction-surface which is arranged to coöperate with the shoes of the driving member, as hereinafter explained. The annular wall, furthermore, carries an inwardly-extending annular flange 33, provided with upstanding teeth 34, arranged to coöperate with the teeth 23 of the shoes.

A coiled spring 35 is interposed between the hub 18 and the head 27, tending to separate the members and hold the shoes 21 out of engagement with the drum. A collar 36 is slidably mounted on the shaft 14 beneath the hub 27, and pivoted to said collar by bolts 37 is the yoke 38 of a lever 39, supported by links 40, said links being pivoted at their upper ends to the lever and having their lower ends pivotally mounted on the plate 10. The rear end of the lever is offset, and to the same is connected a cable 41, passing about guide-pulleys 42 to an actuating-lever 43, mounted on one end of the frame and arranged to be held by a dog and rack 44.

In operation the animal hitched to the whiffletree 16 moves at all times in the same direction, thereby rotating the shaft 14, together with the spider and shoes. Under normal conditions the drum is disconnected from the spider, and consequently remains stationary. When, however, a load to be elevated is attached to the hoisting-cable, it is only necessary to draw upon the actuating-lever 43, whereupon the yoke 38 of the lever 39 will be elevated, thus raising the collar 36 and the drum supported thereupon. This elevation will cause the inner inclined surface 32 of the drum to be brought into contact with the outer sides of the shoes, and the teeth of said drum will in like manner be engaged with the teeth of the shoes. Thus the driving and driven members will be coupled, the drum will be rotated, and the cable wound thereupon. When the load has been detached and it is desired to drop the mechanism carrying the same, the draft-animal may be stopped, or it can continue its movement in the same direction. The operator merely releases the actuating-lever 43, thus allowing the drum to drop under the action of the spring 35, thereby disconnecting it from the spider and allowing it to freely rotate in a reverse direction to that of the shaft 14. As already stated, the apparatus is perhaps particularly useful in connection with hay-stacking and like machines, but is not by any means limited to this use, as it is adaptable for practically any purpose where temporary hoisting means is desired.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In apparatus of the character described, the combination with a rotatable driving member, of a rotatable driven member, one of said members having inclined shoes, the other having a corresponding inclined annular friction-surface disposed concentrically to the axis of rotation of the members and against which the shoes frictionally engage, means for effecting a relative movement of the members to cause the engagement of the shoes and inclined surface and form a friction connection between the members, and means for effecting the separation of said members.

2. In apparatus of the character described, the combination with a rotatable driving member including a shaft having radiating arms and shoes carried by the same, of a rotatable driven member loosely journaled on the shaft and including a drum having an annular shoe-engaged surface, a spring interposed between the members for normally holding the same separated, and means for effecting the relative movement of the members to cause the engagement of the shoes and annular surface of the drum.

3. In apparatus of the character described, the combination with a support, of an upright shaft journaled thereon, a sweep secured to the shaft, a spider secured to the shaft and including radiating arms having shoes at their outer ends, a drum loosely journaled on the shaft and slidable thereon, said drum having an annular wall movable into and out of engagement with the shoes, means for sliding the drum upon the shaft to cause the engagement of the annular wall with the shoes, and means for urging the drum out of such engagement.

4. In apparatus of the character described, the combination with a base-frame, of a yoke mounted thereon, an upright shaft journaled in the frame and yoke, a sweep fixed to the upper end of the shaft, a spider secured to the shaft beneath the yoke and having radiating arms provided with shoes, a drum comprising a hub rotatably and slidably mounted on the shaft beneath the spider, radiating arms carried by the drum, an annular wall carried by the outer ends of the arms and having an inner surface arranged to be engaged by the shoes, a spring interposed between the spider and frame for holding the latter in a lower position, and means engaging the hub of the drum for elevating said drum and causing the engagement of the surface with the shoes.

5. In apparatus of the character described, the combination with relatively rotatable members movable toward and from each other, of a shoe carried by one of the members and movable into and out of engagement with the other member upon the relative movement of said members, said shoe being adjustable upon the member carrying it, and means for holding the shoe in adjusted position.

6. In apparatus of the character described, the combination with relatively rotatable members movable toward and from each other, of a shoe carried by one of the members and movable into and out of engagement with the other member upon the relative movement of said members, said shoe being adjustable upon the member carrying it, and means for adjusting the shoe toward and from the axis of rotation of the member and holding said shoe in different adjusted positions.

7. In apparatus of the character described, the combination with relatively rotatable members, one of said members including a shoe having a head, the other member having a frictional surface, a shoe-block slidably mounted on the head and arranged to contact with the frictional surface, an adjustingscrew engaging the head and block for moving said block, and a clamping-screw engaging the head and block to hold the block in adjusted position.

8. In apparatus of the character described, the combination with relatively rotatable members, one of said members having an annular friction-surface and teeth disposed adjacent to and at one side of the surface, the other having a shoe provided with a friction-surface that coöperates with the surface of the first-mentioned member and having teeth at one side of its friction-surface that in like manner coöperate with the teeth thereof, of means for effecting the movement of the members to engage the coöperating surfaces and teeth.

9. In apparatus of the character described, the combination with a rotatable driving member having radiating arms provided with shoes, said shoes each having a frictional engaging surface on one side and teeth on another side, of a drum having a friction-surface and teeth at one side of the surface and in angular relation thereto the surfaces and teeth of the shoes respectively coöperating with those of the drum, and means for moving the drum to effect the engagement of the coöperating surfaces and teeth.

10. In apparatus of the character described, the combination with a base-frame, of a yoke supported thereby and above the same, an upright shaft journaled in the base-frame and yoke, a sweep fixed to the upper end of the shaft, a spider secured to the shaft beneath the yoke and having radiating arms, shoes secured to the outer ends of the arms and having outer curved friction-surfaces and teeth on their under sides, a drum comprising a hub loosely and slidably mounted on the shaft, radiating arms carried by the hub, an annular wall mounted on the outer ends of the arms and having an upright frictional surface with which the outer faces of the shoes coöperate, said drum being furthermore provided with an inwardly-extending flange having teeth with which the teeth of the shoes coöperate, a spring interposed between the spider and hub for separating the same, a collar mounted on the shaft beneath the drum-hub, and a lever coöperating with the collar for moving the same upon the shaft to carry the drum into coöperation with the shoes.

In testimony that I claim the foregoing as my own I have hereto affixed my signature in the presence of two witnesses.

WILSON W. MILLER.

Witnesses:
GEO. MOREHOUSE,
GEO. G. GUM.